United States Patent

Inoue et al.

Patent Number: 5,392,519
Date of Patent: Feb. 28, 1995

[54] RECIPROCATING SAW

[75] Inventors: Nobuhiro Inoue; Shinobu Yamaguchi, both of Anjo, Japan

[73] Assignee: Makita Corporation, Anjo, Japan

[21] Appl. No.: 113,757

[22] Filed: Aug. 31, 1993

[30] Foreign Application Priority Data

Sep. 2, 1992 [JP] Japan .................................. 4-258964

[51] Int. Cl.6 ............................................. B27B 11/02
[52] U.S. Cl. ...................................... 30/393; 30/394; 30/272.1; 83/647
[58] Field of Search ................. 30/374, 392, 393, 394, 30/166.3, 272.1, 273, 375, 376, 377; 83/647; 173/114, 205

[56] References Cited

U.S. PATENT DOCUMENTS

| | | | |
|---|---|---|---|
| 3,971,132 | 7/1976 | Griffies et al. | 30/393 |
| 4,137,632 | 2/1979 | Pfanzer | 30/393 |
| 4,238,884 | 12/1980 | Walton, II | 30/393 |
| 4,308,852 | 1/1982 | Gebhart . | |
| 4,550,501 | 11/1985 | Moores, Jr. et al. . | |
| 4,628,605 | 12/1986 | Clowers | 30/393 |
| 4,884,344 | 12/1989 | Martinez et al. . | |
| 4,962,588 | 10/1990 | Fushiya et al. . | |

FOREIGN PATENT DOCUMENTS

| | | |
|---|---|---|
| 1628905 | 4/1979 | Germany . |
| 3408847 | 11/1985 | Germany . |
| 3643279 | 6/1988 | Germany . |
| 3222120 | 11/1989 | Germany . |
| 60-75002 | 5/1985 | Japan . |

Primary Examiner—Eugenia Jones
Assistant Examiner—Allan M. Schrock
Attorney, Agent, or Firm—Dennison, Meserole, Pollack & Scheiner

[57] ABSTRACT

A reciprocating saw includes a body and a slider supported by the body such that the slider is slidably movable in a longitudinal direction of the body and is pivotally movable in a vertical direction. A first motion conversion mechanism is operable to convert the rotational movement of the rotary member into a reciprocal movement of the slider in the longitudinal direction. A second motion conversion mechanism is operable to convert the rotational movement of the rotary member into a reciprocal pivotal movement of the slider in the vertical direction. The second motion conversion mechanism includes an arm having one end vertically pivotally connected to the slider. An actuating member is rotatable with the rotary member and has an abutting surface on which the other end of the arm slidably abuts. The abutting position of the other end of the arm on the abutting surface is varied as the actuating member is rotated, so that the vertical position of one end of the arm is varied.

6 Claims, 3 Drawing Sheets

RECIPROCATING SAW

BACKGROUND OF THE INVENTION

1. Field of the Invention

The present invention relates to a reciprocating saw.

2. Description of the Prior Art

A conventional reciprocating saw includes a mechanism for converting the rotation of a motor into a reciprocal movement of a saw blade in a longitudinal direction of a body. In this mechanism, a gear is rotatably driven by the motor within a horizontal plane. A slider is horizontally slidably supported by the body. The gear is disposed below the slider and includes an eccentric pin. The slider includes, on its lower surface, a recess extending in a lateral direction for engagement with the eccentric pin. Further, in order to reciprocally pivot the saw blade in a vertical direction in addition to the reciprocal movement in the longitudinal direction, Japanese Laid-Open Utility Model Publication No. 60-75002 discloses a mechanism in which an annular recess is formed on the upper surface of the gear. The annular recess has a depth varying in a circumferential direction. A rolling member such as a ball and a roller is supported by the rear portion of the slider and are in engagement with the annular recess for rolling movement therewithin. As the gear is rotated, the engaging position of the rolling member varies, so that the slider is reciprocally pivoted in the vertical direction.

Since the reciprocal pivoting movement of the slider is obtained through rolling movement of the rolling member relative to the annular recess, the prior art reciprocating saw involves the following disadvantages:

A. The rolling member and the surface of the annular recess are rapidly abraded by mutual rolling contact. This is particularly remarkable when a large load is applied to the rolling member because of the load applied to the blade.

B. The rotational speed of the rolling member is determined by "Rotational Speed of Gear X Radius of Annular Recess ÷ Radius of Rolling Member". Since the gear is rotated at high speed in this kind of reciprocating saw, a problem may be caused in the strength and the abrasion of the rolling member.

C. Since the rolling member receives the load from the slider through point contact, the rolling member may be easily damaged.

D. Since a particular machining operation is required to form the annular recess on the gear having the varying depth, the machining operation is very troublesome.

SUMMARY OF THE INVENTION

It is, accordingly, an object of the present invention to provide a reciprocating saw having a motion conversion mechanim for vertical pivotal movement, which can be constructed to reduce wear and to prevent damage to slidably contacting parts.

It is another object of the present invention to provide a reciprocating saw having a motion conversion mechanism for vertical pivotal movement, which can be constructed to have a sufficant mechanical strength.

According to the present invention, there is provided a a reciprocating saw comprising:

a body;

a slider supported by the body such that the slider is slidably movable in a longitudinal direction of the body and is pivotally movable in a vertical direction;

a rotary member disposed within the body and rotatably driven by drive means; and a first motion conversion mechanism and a second motion conversion mechanism disposed between the slider and the rotary member, the first motion conversion mechanism being operable to convert the rotational movement of the rotary member into a reciprocal movement of the slider in the longitudinal direction, and the second motion conversion mechanism being operable to convert the rotational movement of the rotary member into a reciprocal pivotal movement of the slider in the vertical direction;

the second motion conversion mechanism including:

an arm having one end vertically pivotally connected to the slider; and an actuating member rotatable with the rotary member and having an abutting surface on which the other end of the arm slidably abuts;

the abutting position of the other end of the arm on the abutting surface is varied as the actuating member is rotated, so that the vertical position of one end of the arm is varied.

The invention will become more fully apparent from the claims and the description as it proceeds in connection with the drawings.

DETAILED DESCRIPTION OF THE PREFERRED EMBODIMENT

An embodiment of the present invention will now be explained with reference to the accompanying drawings.

Figure 1:
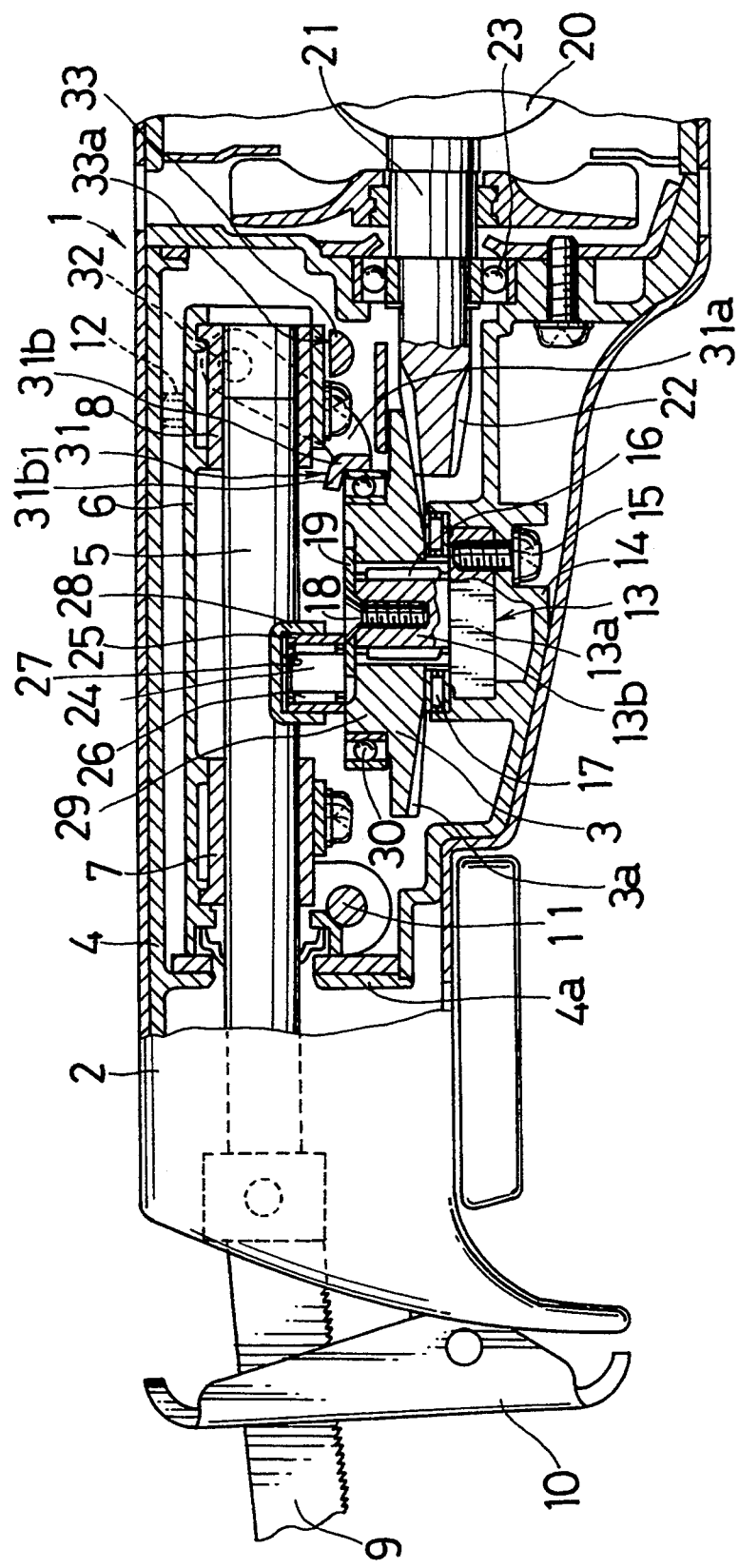
FIG. 1 is a vertical sectional view of the essential parts of a reciprocating saw according to an embodiment of the present invention.

FIG. 1 shows, in sectional view, the essential parts of a reciprocating saw 1. A gear housing cover 4 is mounted within a forward portion of a body 2 of the reciprocating saw 1. The body 2 accommodates a gear 3 as a rotary member therewithin. A slider support 6 is accommodated within the gear housing cover 4 at a position upwardly of the gear 3.

A slider 5 is slidably supported by the slider support 6 in a longitudinal direction of the body 2 through oilless bearings 7 and 8. The bearings 7 and 8 are mounted on the forward and rearward portions of the slider support 6, respectively. The slider 5 extends forwardly beyond a partition wall 4a disposed on the forward portion of the gear housing cover 4. A saw blade 9 is connected to the extended forward end of the slider 5 and protrudes from the forward end of the body 2. A shoe 10 is mounted on the forward end of the body 2.

The forward and lower portion of the slider support 6 is vertically pivotally mounted on the gear housing cover 4 through a pin 11. A spring 12 is interposed between the upper surface of the rear end of the slider support 6 and the inner surface of the gear housing cover 4 opposed to each other, so that the rear of the slider support 6 is biased to downwardly pivot around the pin 11.

A gear shaft 13 for supporting the gear 3 is disposed vertically at a position below substantially the central portion of the slider support 6 in the longitudinal direction and just below the slider 5. The gear shaft 13 includes a lower portion 13a and an upper shaft portion 13b having a smaller diameter. The lower portion 13a is fixedly mounted on a mounting portion 14 formed integrally with the gear housing cover 4 through a screw 15. The upper shaft portion 13b extends vertically upwardly from the lower portion 13a. The gear 3 is fitted on the upper shaft portion 13b and the lower surface of the gear 3 is supported by the lower portion 13a. A radial bearing 16 and a thrust bearing 17 are disposed between the gear 3 and the upper shaft portion 13b and between the gear 3 and the lower portion 13a, respectively. A washer 19 is fixed to the upper end of the upper shaft portion 13b by a screw 18. The washer 19 contacts the upper surface of the gear 3 so as to prevent the gear 3 from movement in the axial direction. Thus, the gear 3 is rotatable around the gear shaft 13 in the horizontal plane.

The gear 3 is a bevel gear and has, on its lower surface, teeth 3a inclined upwardly in a radial direction. The gear 3 having the teeth 3a is in engagement with a pinion 22 formed integarally with a forward end of a motor shaft 21 of a motor 20. The motor 20 is disposed within the body 2 at a position rearwardly of the gear housing cover 4, and the motor shaft 21 extends forwardly into the gear housing cover 4. The motor shaft 21 is supported by the gear housing cover 4 through a bearing 23.

A first motion conversion mechanism is disposed between the slider 5 and the gear 3 for converting the rotation of the gear 3 into the reciprocal movement of the slider 5 in the longitudinal direction of the body 2. A second motion conversion mechanism is also disposed between the slider 5 and the gear 3 for converting the rotation of the gear 3 into the reciprocal vertical pivotal movement via the slider support 6. The construction of these first and second motion conversion mechanisms will now be explained.

Figure 2:
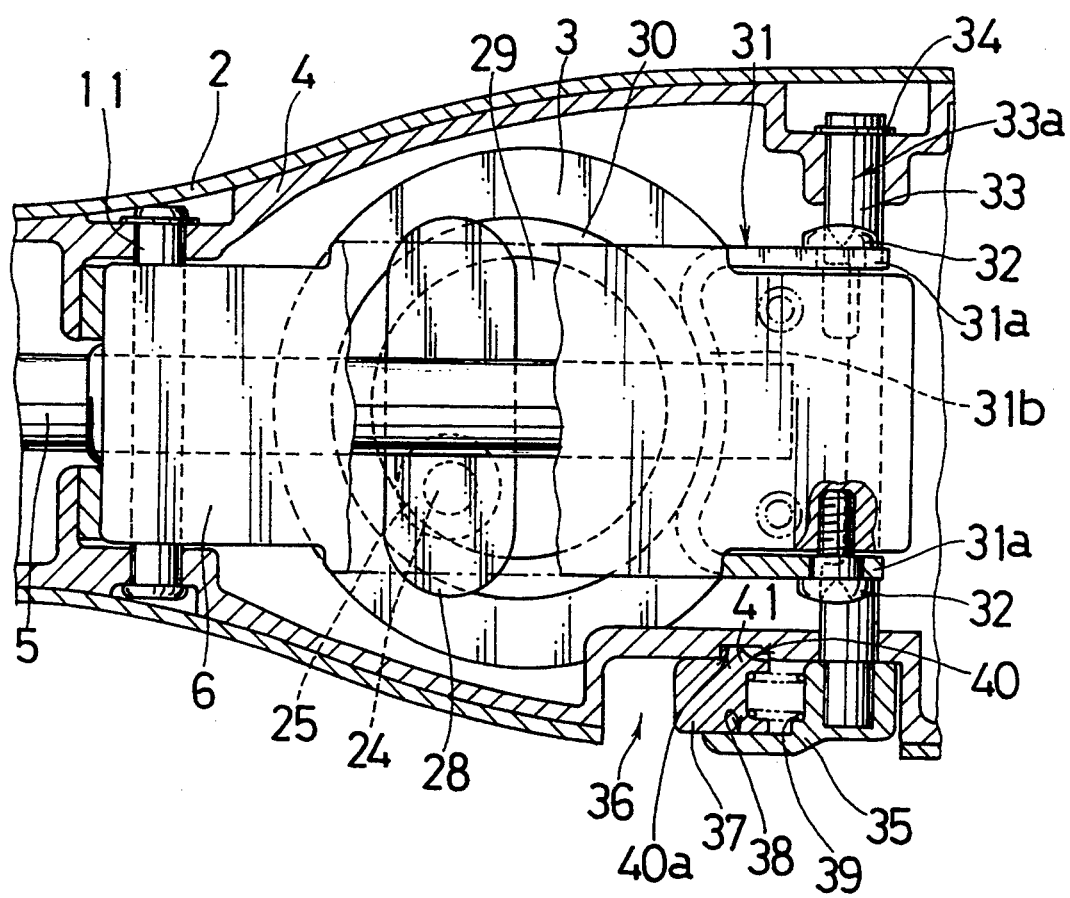
FIG. 2 is a horizontal sectional view of FIG. 1 showing a slider.
Figure 3:
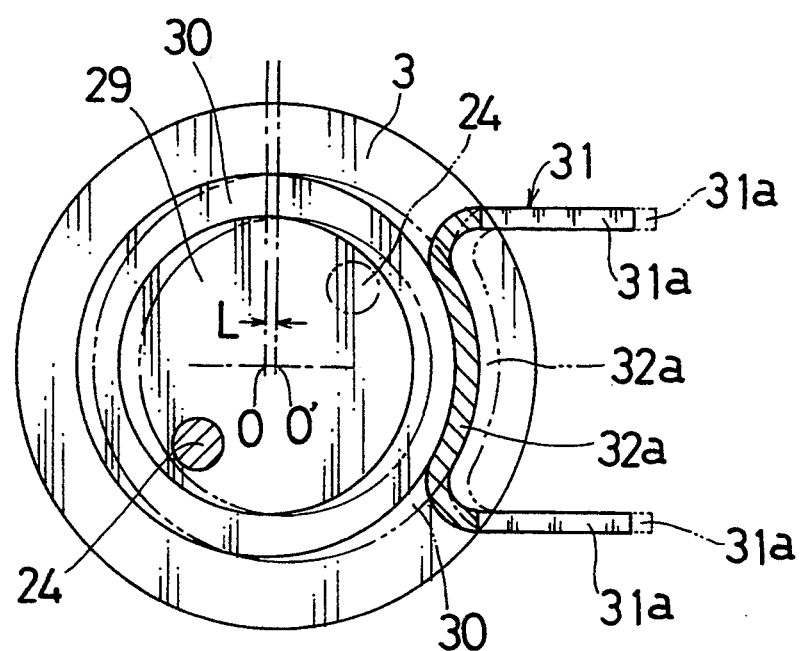
FIG. 3 is an explanatory view showing the relationship between an actuation member and an arm shown in FIG. 1.

The first motion conversion mechanism includes a pin 24 mounted on the gear 3 at a position displaced from the axis of the gear shaft 13. The lower portion of the pin 24 is embedded into the gear 3, while the upper portion of the pin 24 extends vertically upwardly from the gear 3. A roller 25 is rotatably fitted on the outer surface of the pin 24 via a bearing 26. The lower portion of the slider support 6 is opened at a position opposite to the upper surface of the gear 3, and the lower surface of the slider 5 corresponding to the opened portion of the slider support 6 includes a guide member 28 (see FIG. 2) fixedly mounted thereon. The guide member 28 includes a linear recess 27 extending in a lateral direction of the slider 5, and the roller 25 of the gear 3 is in engagement with the recess 27. The guide member 28 has a generally inverted U-shaped configuration in section, and the recess 27 has an elongated configuration having closed ends. Since the position of the slider 5 relative to the pin 24 is varied to some extent from a vertical position relative thereto in response to the vertical pivotal movement given by the second motion conversion mechanism, a suitable gap is provided between the roller 25 of the pin 24 and the guide member 28 so as to absorb such variation of position.

The second motion conversion mechanism for converting the rotational movement of the gear 3 into the reciprocal vertical pivotal movement will now be explained. The upper part of the gear 3 to which the pin 24 is mounted is formed as a disc-like member 29 having a center 0' displaced from a center 0 of rotation of the gear 3 or the central axis of the gear shaft 13 by a distance L. An annular bearing 30 is mounted on the outer surface of the disc-like member 29.

A generally U-shaped arm 31 has an upper end pivotally mounted on the rear end of the slider support 6 via screws 32 at both lateral portions 31a, so that the arm 31 extends obliquely downwardly toward the gear 3. The arm 31 has a lower end 31b which connects the lateral portions 31b to each other. The lower end 31a contacts the outer peripheral surface of the bearing 30 of the disc-like member 29 and has a curved configuration corresponding to the outer peripheral surface of the bearing 30. As shown in FIG. 1, the lower end 31b includes an engaging portion 31b1 for engagement with an upper edge of the outer peripheral surface of the bearing 30. The engaging portion 31b1 is integrally formed on an upper edge of the lower end 31b at the central position thereof and is bent substantially perpendicular thereto. As described above, the slider support 6 is biased by the spring 12 in the downward pivoting direction, and the engaging portion 3161 cooperates with the spring 12 to keep the end portion 31b in abutment on the outer peripheral surface of the bearing 30.

A vertical stroke adjusting mechanism is associated with the second motion conversion mechanism. The construction of the vertical stroke adjusting mechanism will now be explained. As shown in FIG. 1, a rod 33 having a semi-circular configuration in section is disposed adjacent the lower surface of the rear portion of the slider support 6 and extends in a lateral direction. The rod 33 has both ends rotatably supported by the gear housing cover 4 and extending outwardly therefrom. A snap ring 34 is fitted on one end of the rod 33 for engagement with the outer surface of the gear housing cover 4. A lever 35 is fixedly mounted on the other end of the rod 33 and slidably contacts the outer surface of the gear housing cover 4.

The lever 35 is operable from the outside through an opening 36 formed on the body 2. A recess 38 is formed on the lever 35 and partly receives a stopper 37 in such a manner that the stopper 37 is movable in a radial direction of the rod 33 and is rotatable together with the lever 35. The stopper 37 is biased by a spring 39 in a direction radially outwardly of the rod 33 and has a protrusion 41 in engagement with an arcuate recess 40 formed on the outer surface of the gear housing cover 4.

Figure 4:
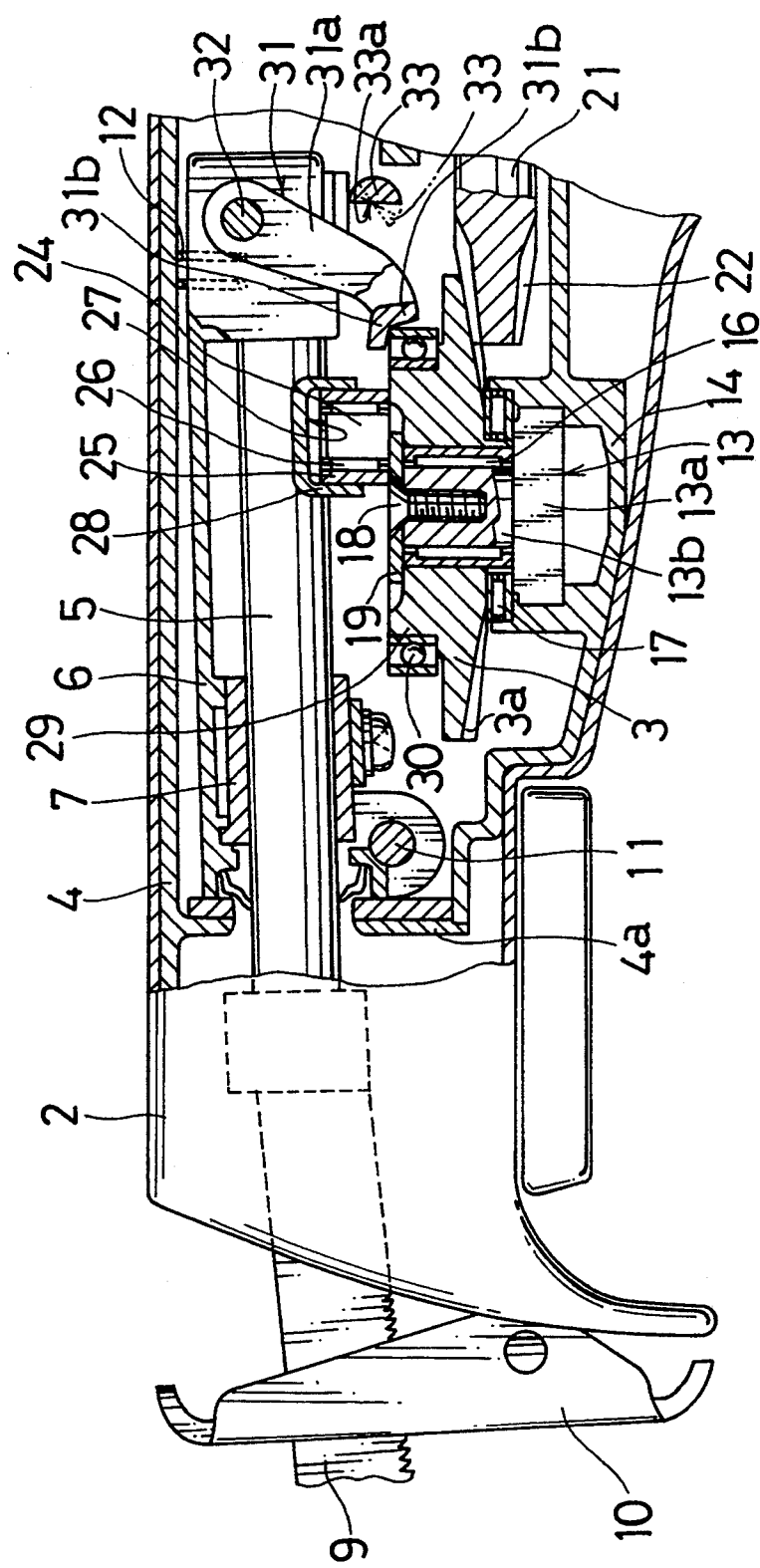
FIG. 4 is sectional view similar to FIG. 1 but showing a different operation.

The arcuate recess 40 includes a plurality of radial engaging recess portions 40a (one shown in FIG. 2) which are spaced from each other by a suitable distance in a circumferential direction of the rod 33. Through engagement of the protrusion 41 of the stopper 37 with either one of the engaging recess portions 40a, the rotational position of the rod 33 can be selectively determined by stages within an angle of 90° between a horizontal position where a flat surface 33a extending in a diametrical direction of the rod 33 is positioned in parallel with the lower surface of the rear portion of the slider support 6 as shown in FIG. 1, and a vertical position where the flat surface 33a extends perpendicular to the lower surface of the rear portion of the slider support as shown in FIG. 4.

The operation of the above embodiment will now be explained.

When the rod 33 is positioned at the vertical position, the rod 33 may not interfere with the slider support 6. When the motor 23 is driven at this state, the rotation of the motor shaft 21 is transmitted to the gear 3 through engagement of the pinion 22 of the motor shaft 21 with the gear teeth 3a of the gear 3, so that the gear 3 is rotated within a horizontal plane around the gear shaft 13.

As the gear 3 is thus rotated, the pin 24 of the first motion conversion mechanism extending upwardly from the gear 3 is rotated in an orbital manner. Then, the slider 5 is reciprocally moved in the longitudinal direction in response to change of position of the pin 24 in the same directions, while the pin 24 is moved laterally reciprocally along the recess 27 of the guide member 28 via the roller 25.

On the other hand, in the second motion conversion mechanism, the disc-like member 29 formed on the upper portion of the gear 3 is rotated in an orbital manner as the gear 3 is rotated, so that the contacting position of the lower end 31b of the arm 31 with the rear portion of the outer peripheral surface of the bearing 30 of the disc-like member 29 is periodically varied in the longitudinal direction between distance 2L. Although the slider support 6 itself cannot be moved in the longitudinal direction, the slider support 6 can be pivoted around the pin 11. Therefore, as the contacting position of the lower end 31b of the arm 31 is changed, the height of the pivotal axis of the arm 31 corresponding to the axis of the screws 32 is changed with the arm 31 pivoted around the pivotal axis, so that the slider 5 as well as the slider support 6 is reciprocally vertically pivoted around the pin 11. The lower end 31b of the arm 31 is positioned at its most forward position when the slider support 6 and the slider 5 extends substantially in parallel with a longitudinal direction of the body 2 as shown in FIG. 1, so that the slider 5 is positioned at its lowermost pivotal limit in the state of FIG. 1.

With the second motion conversion mechanism thus constructed, the lower end 31b of the arm 31 is reliably maintained in abutting relationship with the bearing 30 by the biasing force of the spring 12 with the engaging portion 31b1 engaged with the upper end of the outer peripheral surface of the bearing 30. Further, with the interposition of the bearing 30 between the lower end 31b and the disc-like member 29, the lower end 31b does not receive frictional force in the rotational direction by the disc-like member 29, so that the lower portion 31b can be smoothly moved only by the force in the longitudinal direction produced because of the orbital movement. Additionally, the lower end 31b has the curved configuration corresponding to the configuration of the outer peripheral surface of the bearing 30. Therefore, the contact area of the lower end 31b with the bearing 30 is large during pivotal movement, so that the load applied by the bearing 30 is dispersed. This may improve the strength of the arm 31.

Here, although the vertical pivotal stroke is proportional to the distance L of the displacement of the disc-like member 29, the vertical pivotal stroke can be adjusted by the adjusting mechanism which is operable to vary the rotational position of the rod 33. The operation for varying the stroke will now be explained.

When the operator pushes, in the state of FIG. 1, the stopper 37 into the lever 35 against the force of the spring 39, the protrusion 42 is disengaged from the engaging recess portion 40a as engaged and is moved toward the arcuate recess 40, so that the lever 35 is permitted to be rotated. Then, the operator rotates the lever 35 to a position where the protrusion 41 is opposed to the other one of the engaging recess portions 40a. The operator thereafter releases the stopper 37, so that the protrusion 41 engages the other one of the engaging recess portions 40a. Consequently, the determination of the rotational position of the rod 33 can be performed by steps within an angle of 90° from a horizontal position shown in FIG. 1 to a vertical position shown in FIG. 4 where the planer surface 33a is positioned substantially perpendicular to the lower surface of the rear portion of the slider support 6.

As the rod 33 is rotated from the horizontal position to the vertical position, the edge of the planer surface 33a abuts on the lower surface of the rear portion of the slider support 6 so as to pivot the slider support 6 upwardly against the biasing force of the spring 12. Thus, the lowermost end of the vertical stroke movement produced by the second motion conversion mechanism is moved upwardly, so that the vertical stroke is decreased.

When the rod 33 reaches the vertical position shown in FIG. 4, the slider support 6 is pivoted to a position where the lowermost end substantially coincides with the upper most position of the stroke movement. At this stage, the lower end 31b of the arm 31 contacts the upper edge of the outer peripheral surface of the bearing 30 by the corner portion formed between the lower end 31 and the engaging portion 31b1 when the disc-like member 29 is positioned at its rearmost position shown in FIG. 4. The arm 31 therefore does not receive the force in the longitudinal direction from the disc-like member 29 and only the lower surface of the engaging portion 31b1 slidably contacts the upper surface of the bearing 30 when the disc-like member 29 is positioned forwardly of the rearmost position. Thus, the saw blade 9 as well as the slider 5 is reciprocally moved only in the longitudinal direction by the first motion conversion mechanism.

While the invention has been described with reference to a preferred embodiment, it is to be understood that modifications or variation may be easily made without departing from the spirit of this invention which is defined by the apended claims.

What is claimed is:

1. A reciprocating saw comprising:
   a body;
   a slider supported by said body such that said slider is slidably movable in a longitudinal direction of said body and is pivotally movable transversely relative to said longitudinal direction;
   a rotary member disposed within said body and rotatably driven by drive means;
   a first motion conversion mechanism and a second motion conversion mechanism disposed between said slider and said rotary member, said first motion conversion mechanism operating to convert the rotational movement of said rotary member into a reciprocal movement of said slider in the longitudinal direction of said body, and said second motion conversion mechanism operating to convert the rotational movement of said rotary member into a reciprocal transverse pivotal movement of said slider;

said second motion conversion mechanism including:

an arm having first and second ends, means for pivotally engaging said first end with said slider and for supporting said slider; and an actuating member rotatable with said rotary member and having an abutting surface, said second end of said arm slidably abutting said abutting surface in an abutting position;

said abutting position of the second end of said arm on said abutting surface being varied as said actuating member is rotated, wherein the transverse position of said first end of said arm is varied relative to said longitudinal direction to transversely pivot said slider, said abutting surface of said actuating member having a generally circular configuration and a central axis displaced from a rotational axis of said rotary member, said second end of said arm having a curved configuration corresponding to the curvature of said abutting surface and defining an elongate arcuate contact area between said second end and abutting surface;

said actuating member including a disc-like member having said central axis and including an annular bearing fitted on said disc-like member coaxially therewith; said abutting surface being formed by an outer peripheral surface of said bearing.

2. The reciprocating saw of claim 1 including biasing means for normally biasing said arm in a direction to abut on said abutting surface.

3. The reciprocating saw of claim 2 wherein said actuating member is disposed to one side of said slider and is rotatably driven within a first plane about an axis transverse to said longitudinal direction as said rotary member rotates; said second end of said arm including an engaging member engaged over an edge of said actuating member adjacent said abutting surface; said arm extending in a second plane generally perpendicular to said first plane of said actuating member; and said engaging member cooperating with said biasing means and maintaining the position of said second end of said arm against said actuating member.

4. A reciprocating saw comprising:

a body;

a slider supported by said body such that said slider is slidably movable in a longitudinal direction of said body and is pivotally movable transversely relative to said longitudinal direction;

a rotary member disposed within said body and rotatably driven by drive means;

a first motion conversion mechanism and a second motion conversion mechanism disposed between said slider and said rotary member, said first motion conversion mechanism operating to convert the rotational movement of said rotary member into a reciprocal movement of said slider in the longitudinal direction of said body, and said second motion conversion mechanism operating to convert the rotational movement of said rotary member into a reciprocal transverse pivotal movement of said slider;

said second motion conversion mechanism including:

an arm having first and second ends, means for pivotally engaging said first end with said slider and for supporting said slider; and an actuating member rotatable with said rotary member and having an abutting surface, said second end of said arm slidably abutting said abutting surface in an abutting position;

said abutting position of the second end of said arm on said abutting surface being varied as said actuating member is rotated, wherein the transverse position of said first end of said arm is varied relative to said longitudinal direction to transversely pivot said slider, said abutting surface of said actuating member having a generally circular configuration and a central axis displaced from a rotational axis of said rotary member, said actuating member including a disc-like member having said central axis and including an annular bearing fitted on said disc-like member coaxially therewith; said abutting surface being formed by an outer peripheral surface of said bearing.

5. The reciprocating saw of claim 4 wherein said means for pivotally engaging said arm first end and for supporting said slider comprises a slider support supporting said slider with said slider slidably movable in said longitudinal direction relative to said slider support; said slider support being pivotally supported by said body; said means for pivotally engaging said arm first end and for supporting said slider further comprising pivot means pivotally connecting said first end of said arm of said second motion conversion mechanism to said slider support.

6. A reciprocating saw comprising:

a body;

a slider supported by said body such that said slider is slidably movable in a longitudinal direction of said body and is pivotally movable transversely relative to said longitudinal direction;

a rotary member disposed within said body and rotatably driven by drive means;

a first motion conversion mechanism and a second motion conversion mechanism disposed between said slider and said rotary member, said first motion conversion mechanism operating to convert the rotational movement of said rotary member into a reciprocal movement of said slider in the longitudinal direction of said body, and said second motion conversion mechanism operating to convert the rotational movement of said rotary member into a reciprocal transverse pivotal movement of said slider;

said second motion conversion mechanism including:

an arm having first and second ends, means for pivotally engaging said first end with said slider and for supporting said slider; and an actuating member rotatable with said rotary member and having an abutting surface, said second end of said arm slidably abutting said abutting surface in an abutting position;

said abutting position of the second end of said arm on said abutting surface being varied as said actuating member is rotated, wherein the transverse position of said first end of said arm is varied relative to the longitudinal direction to transversely pivot said slider, said means for pivotally engaging said arm first end and for supporting said slider comprises a slider support supporting said slider with said slider slidably movable in said longitudinal direction relative to a slider support; said slider support being pivotally supported by said body; said means for pivotally engaging said arm first end and for supporting said slider further comprising pivot means pivotally connecting said first end of said arm of said second motion conversion mechanism to said slider support, said abutting surface of said actuating member having a generally circular configuration and a central axis displaced from a rotational axis of aid rotary member, said second end of said arm having a curved configuration corresponding to the curvature of said abutting surface and defining an elongate arcuate contact area between said second end and said abutting surface;

said actuating member including a disc-like member having said central axis and including an annular bearing fitted on said disc-like member coaxially therewith; said abutting surface being formed by an outer peripheral surface of aid bearing.

* * * * *

UNITED STATES PATENT AND TRADEMARK OFFICE
CERTIFICATE OF CORRECTION

PATENT NO. : 5,392,519

DATED : February 28, 1995

INVENTOR(S) : Nobuhiro Inoue and Shinobu Yamaguchi

It is certified that error appears in the above-identified patent and that said Letters Patent is hereby corrected as shown below:

Column 9, line 5, "aid" should be --said--.

Column 10, line 7, "aid" should be --said--.

Signed and Sealed this

Twenty-fifth Day of April, 1995

*Attest:*

BRUCE LEHMAN

*Attesting Officer*     *Commissioner of Patents and Trademarks*